United States Patent [19]

Okutani

[11] Patent Number: 4,843,236

[45] Date of Patent: Jun. 27, 1989

[54] MOVABLE OBJECT POSITION DETECTING METHOD AND APPARATUS

[75] Inventor: Norio Okutani, Neyagawa, Japan

[73] Assignee: Matsushita Electric Industrial Co., Ltd., Osaka, Japan

[21] Appl. No.: 174,950

[22] Filed: Mar. 29, 1988

[30] Foreign Application Priority Data

Apr. 2, 1987 [JP] Japan .................. 62-81416

[51] Int. Cl.$^4$ .............................. G01D 5/34
[52] U.S. Cl. .................. 250/231 SE; 250/237 G; 356/356
[58] Field of Search .............. 250/231 SE, 237 G; 356/356, 358, 363, 395, 354

[56] References Cited

U.S. PATENT DOCUMENTS

| 3,427,463 | 2/1969 | Weyrauch | 250/237 G |
| 3,713,139 | 1/1973 | Sanford et al. | 250/237 G |
| 4,265,534 | 5/1981 | Remijan | 356/354 |
| 4,326,128 | 4/1982 | Klein | 250/237 G |
| 4,395,124 | 7/1983 | Remijan | 356/356 |
| 4,542,989 | 9/1985 | Remijan | 356/356 |
| 4,678,908 | 7/1987 | La Plante | 250/237 G |

FOREIGN PATENT DOCUMENTS 189415 8/1986 Japan .
153424 6/1988 Japan .

Primary Examiner—David C. Nelms
Assistant Examiner—Stephone B. Allen
Attorney, Agent, or Firm—Stevens, Davis, Miller & Mosher

[57] ABSTRACT

A movable object position detecting method and apparatus perform detection of an absolute position of a code plate attached to the movable object, by using at least two position detection parts which include an upper-digit (namely, lower-order) position detection part and a lower-digit (namely, higher-order) position detection part, respectively. The upper-digit position detection part detects the absolute position of the code plate within a predetermined detection range to provide binary detection data. The lower-digit position detection part detects a position of the code plate within a detection range twice as large as a minimum detection width of the upper-digit position detection part to provide digitized detection data. By processing detection data on the basis of the coincidence or difference between respective overlapping digits of detection data of the upper-digit position detection part and detection data of the lower-digit position detection part, accurate position data of the code plate are determined.

4 Claims, 6 Drawing Sheets

FIG. 1

DETECTION DATA

| $A_0$ $B_0$ $C_0$ $D_0$ $E_0'$ |
| $E_0$ $F_0$ $G_0$ $H_0$ $I_0$ $J_0$ $K_0$ $L_0'$ |
| $L_0$ $M_0$ |

$L_0 \neq L_0'$ & $L_0' \neq M_0 \Rightarrow K_0$
$L_0' = K_0 \Rightarrow J_0$
$K_0 = J_0 \Rightarrow I_0$
$J_0 = I_0 \Rightarrow H_0$
$I_0 = H_0 \Rightarrow G_0$
$H_0 = G_0 \Rightarrow F_0$
$G_0 = F_0 \Rightarrow E_0$

TEMPORARY DATA

| $A_0$ $B_0$ $C_0$ $D_0$ $E_0'$ |
| $E_1$ $F_1$ $G_1$ $H_1$ $I_1$ $J_1$ $K_1$ $L_1$ $M_1$ |

$E_0' \neq E_1$ & $E_0' \neq F_1 \Rightarrow D_0$
$E_0' = D_0 \Rightarrow C_0$
$D_0 = C_0 \Rightarrow B_0$
$C_0 = B_0 \Rightarrow A_0$

POSITION DATA $A_1$ $B_1$ $C_1$ $D_1$ $E_1$ $F_1$ $G_1$ $H_1$ $I_1$ $J_1$ $K_1$ $L_1$ $M_1$

MOVABLE OBJECT POSITION DETECTING METHOD AND APPARATUS

BACKGROUND OF THE INVENTION

1. Field of the Invention

The present invention relates to a movable object position detecting method and apparatus, and more particularly to such a method and apparatus for use in an absolute type of encoder which detects an absolute position of a movable object.

2. Description of the Related Art

A typical one of the conventional absolute type of encoders is constructed by a light source, a code plate which is attached to a movable object whose position is to be detected and which has in the direction of movement of the movable object a plurality of tracks in which binary code patterns are formed, and a plurality of light detector elements arranged opposite to the plural tracks, whereby output signals of the light detector elements are detected to determine a position of the code plate.

There is known another absolute type of encoder formed by a combination of the above-mentioned position detection system using the binary code patterns and an incremental position detection system. In this type of encoder, a rough absolute position of the code plate is detected with a predetermined detection width by means of the binary code patterns and a precise position of the code plate within the predetermined detection width is detected in the incremental mode.

Further, JP-A-No. 61-189415 discloses a scale position detecting apparatus which comprises an absolute position detection part using binary code patterns for detecting an absolute position of a scale and a high resolution position detection part for detecting a position of the scale within the minimum detection width of the absolute position detection part by using a phase splitting technique.

Furthermore, Japanese Patent Application No. 61-300909 assigned to the assignee of this application has proposed a movable object position detecting apparatus which comprises a first-order position detection part for detecting the absolute position of a code plate attached to the movable object by means of patterns regularly arranged in the code plate, and a second-order position detection part for lower digits lower than those of the first-order position detection part for detecting a position of the code plate within the minimum detection width of the first-order position detection part, by means of inclined slits, which are formed in the code plate at a periodical pitch of arrangement equal to the minimum detection width of the first-order position detection part and making an angle of $\theta(0° < \theta \leq 90°)$ with the direction of movement of the code plate, and slits, which are formed in a mask to be opposite to the inclined slits formed in the code plate, the relation between the first and second order position detection parts being repeated successively.

The above-mentioned encoders or position detecting apparatuses involve the following problems.

Namely, in the case of the first-mentioned encoder using the binary code patterns, the improvement of the precision of position detection requires the formation of an extremely great number of tracks and the provision of the corresponding number of light detector elements. Therefore, this encoder has a problem that complicated processing of signals is required and the cost of the encoder becomes very high.

Though the second-mentioned encoder based on the combination of the position detection system using binary code patterns and the incremental detection system has a merit that relatively less numbers of binary code patterns and light detector elements suffice, thereby making it possible to perform position detection with high precision by an inexpensive structure, an operation of this encoder requires detecting a rough position of the code plate with a predetermined detection width by using binary code patterns, thereafter detecting a reference position set within the predetermined detection width by searching a reference signal pattern, and then incrementally detecting an amount of displacement from the detected reference position to a position to be detected. Thus, this encoder has a problem that the operation becomes complicated, thereby making a response speed slow.

The above-mentioned position detecting apparatus formed by a mere combination of the absolute position detection part using binary code patterns and the high resolution position detection part based on the phase splitting technique has a problem that, as a detection range is made wider, the pitch of slits formed in the high resolution position detection part becomes greater correspondingly, thereby lowering the precision of detection by the phase splitting technique. Further, there is a problem that, unless the boundary of a detection range in the absolute position detection part and the boundary of a detection range in the high resolution detection part are respectively made to coincide with each other with precision higher than a precison with which the position detection should be made, an error may be produced in detection data at those boundaries.

The fourth-mentioned position detecting apparatus using the inclined slits also has a problem that a detection error may be produced due to the discontinuity at the boundary between the higher-order and lower-order position detection parts.

SUMMARY OF THE INVENTION

In view of the above-mentioned problems, the present invention aims to provide a movable object position detecting method and apparatus which can detect an absolute position of a code plate attached to the movable object with high precision and with satisfactory response without producing any detection error resulting from the discontinuity between the boundaries of the position detection parts.

To attain the object, a movable object position detecting method according to the present invention comprises: a step of detecting an absolute position of a code plate attached to the movable object by a first-order position detection part provided with patterns regularly arranged in the code plate, thereby providing binary detection data; a step of detecting a position of the code plate within a predetermined detection range by a second and higher order position detection parts, thereby providing binary detection data, the predetermined detection range being twice as large as the minimum detection width of a next lower order position detection part; and a step of performing position detection at a boundary portion between a lower order position detection part and a next higher-order position detection part on the basis of the coincidence or difference between respective overlapping digits of detection data obtained by the lower-order position detection part and detection data obtained by the next higher-order position detection part.

A movable object position detecting apparatus according to the present invention comprises a first-order position detection part for detecting an absolute position of a code plate attached to the movable object by means of patterns regularly arranged in the code plate, thereby providing binary position data, a second and higher-order position detection parts for detecting a position of the code plate within a detection range twice as large as the minimum detection width of a next lower order position detection part, thereby providing binary position data, and a data processing circuit for producing correct position data by performing a logical operation on the basis of the coincidence or difference between respective overlapping digits of detection data obtained by the lower-order (upper-digit) position detection part and detection data obtained by a next higher-order (lower-digit) position detection part, or a storage section to which the detection data obtained by the respective position detection parts are inputted as address data and in which position data corresponding to respective addresses are stored, or an operational processing section for producing position data by correcting detection data obtained by the lower-order (upper-digit) position detection part on the basis of the coincidence or difference between respective overlapping digits of detection data obtained by the lower-order (upper-digit) position detection part and detection data obtained by a next higher-order (lower-digit) position detection part.

According to the movable object position detecting method of a first aspect of the present invention, an absolute position of the code plate attached to the movable object is detected with a predetermined position detection width in the first-order position detection part, and simultaneously an absolute position of the code plate within a minimum position detection width of each of the first and higher order position detection parts is detected by a next higher order position detection part. Therefore, an absolute position of the code plate can be detected with high precision, at low cost by using a smaller number of light detector elements, and with satisfactory response. Further, since detection data are processed in the form of binary data, and the detection range of a lower-digit (or higher-order) position detection part is selected to be twice as large as the minimum position detection width of a next upper-digit (or lower-order) position detection part and position detection at a boundary portion between an upper-digit position detection part and a next lower-digit position detection part is performed on the basis of the coincidence or difference between respective overlapping digits of detection data of the upper-digit position detection part and detection data of the next lower-digit position detection part, any detection error can be completely eliminated by determining mutual overlapping at the boundary portions between the upper-digit and lower-digit position detection parts with precision which is one half the position precision corresponding to the overlapping digits.

According to the movable object position detecting apparatus of a second aspect of the present invention using a data processing circuit, since the data processing circuit can output correct position data by correcting detection data by means of hardware on a real time basis, a high speed response can be attained. According to the movable object position detecting apparatus of a third aspect of the present invention using a storage section, since position data are outputted from the storage section in accordance with addresses corresponding to detection data, it is possible to obtain satisfactory response and to perform correction of position data stored in the storage section so as to correct any detection error occurring at each of the position detection parts. According to the movable object position detecting apparatus of a third aspect of the present invention using an operational processing section, since position data can be obtained by means of software involved in the operational processing part, it is possible to simplify a hardware construction of the apparatus and hence to construct the apparatus at low cost.

BRIEF DESCRIPTION OF THE DRAWINGS

FIG. 1 is an explanatory drawing for explaining the processing of data according to an embodiment of the present invention;

DESCRIPTION OF THE PREFERRED EMBODIMENTS

An embodiment of the present invention will now be explained in reference to the accompanying drawings.

Figure 4:
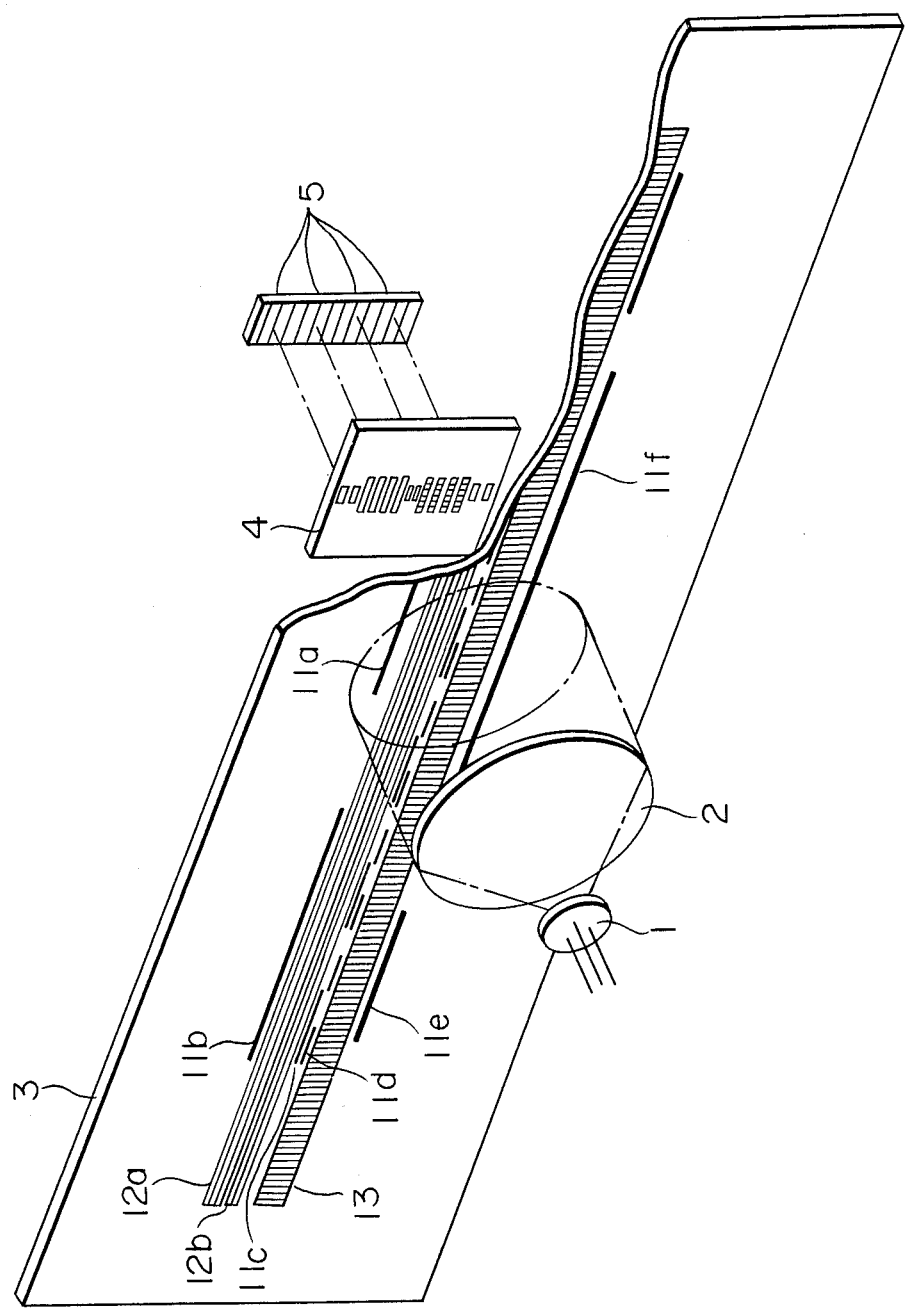
FIG. 4 is a perspective view schematically showing the overall structure of an movable object position detecting apparatus of an embodiment of the present invention.

Referring to FIG. 4 showing the overall structure of a movable object position detecting apparatus according to the present invention, reference numeral 1 designates a laser diode, numeral 2 a collimator lens, numeral 3 a code plate, numeral 4 a mask, and numeral 5 a light detector.

Figure 5:
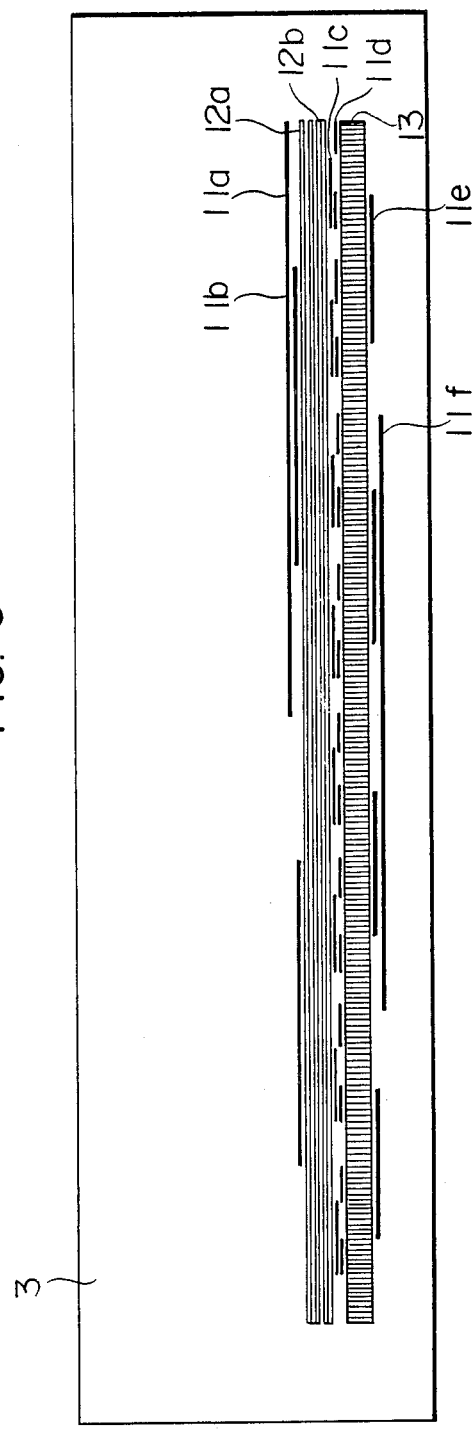
FIG. 5 is a front view of a code plate shown in FIG. 4.
Figure 6:
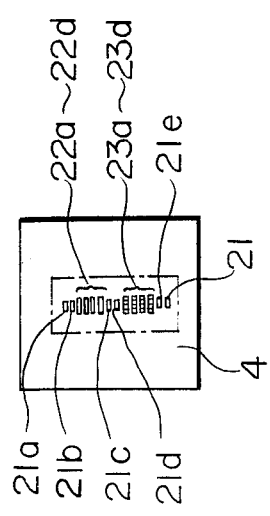
FIG. 6 is a front view of a mask shown in FIG. 4.
Figure 7:
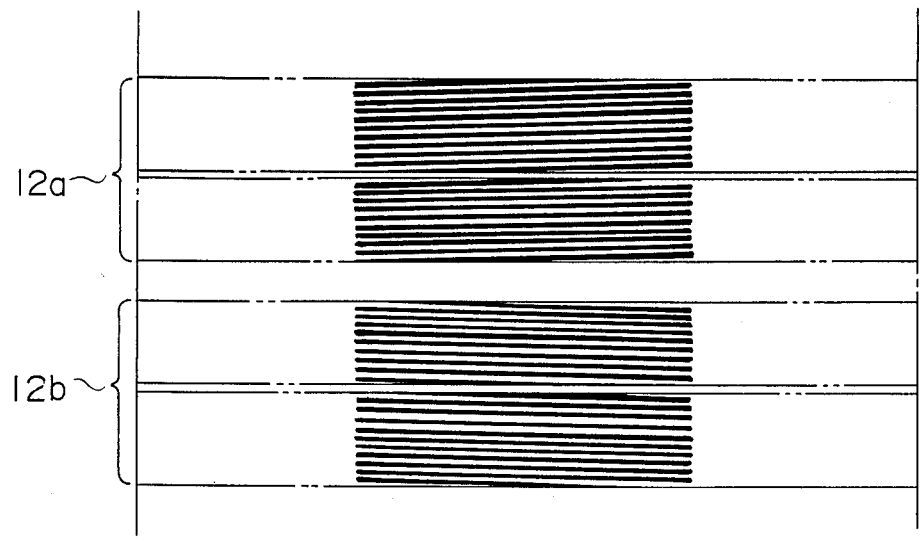
FIG. 7 is an enlarged partial front view of the code plate.

The code plate 3 has nine tracks arranged in the direction of movement of the code plate, and binary code patterns 11a–11f constituted by unidimensional Fresnel zone plates are arranged in six tracks among the nine tracks, as shown in FIG. 5. Light transmitted through the binary code patterns 11a–11f constituted by the Fresnel zone plates is converged and focused on respective focal points of the Fresnel zone plates. Each of the Fresnel zone plates is designed so that light diffracted by a multiplicity of regularly formed slits is converged into its focal point. Assuming that the focal length of the Fresnel zone plates is F, the wavelength of the light is $\lambda$, and the distance from the center line to the inner edge of the N-th slit is $R_n$, light transmitted through the binary code patterns 11a–11f is converged into the focal point represented approximately by $F=(R_n)^2/N\cdot\lambda$. Therefore, the mask 4 is placed at a position apart from the code plate 3 through the focal distance F. The mask 4 has slits 21a–21f formed corresponding to the binary code patterns 11a–11f, as shown in FIG. 6. When a projected image of the binary code patterns 11a–11f, which is converged into the mask 4, coincides with the slits 21a–21f, light detector elements 51a–51f (see FIG. 9) of the light detector 5 corresponding to the slits 21a–21f produce respective output signals.

The other two tracks of the code plate 3 are respectively provided with two kinds of inclined slit groups 12a and 12b which respectively include a multiplicity of slits arranged at a predetermined pitch in the direction of movement of the code plate 3, namely, at a pitch equal to the minimum position detection width detectable by the binary code patterns 11a–11f and being inclined to cross the direction of movement of the code plate 3. The slits in the inclined slit group 12a and the slits in the inclined slit group 12b are inclined at an angle $\theta$ symmetrically with respect to the direction of movement of the code plate 3. For example, the inclination angle $\theta$ is set to 0.45°, when the arrangement pitch of the slits in the direction of movement of the code plate 3 is 3.2768 mm and the spatial interval between two slits is 0.0256 mm in order to raise the precision of detection.

Figure 8:
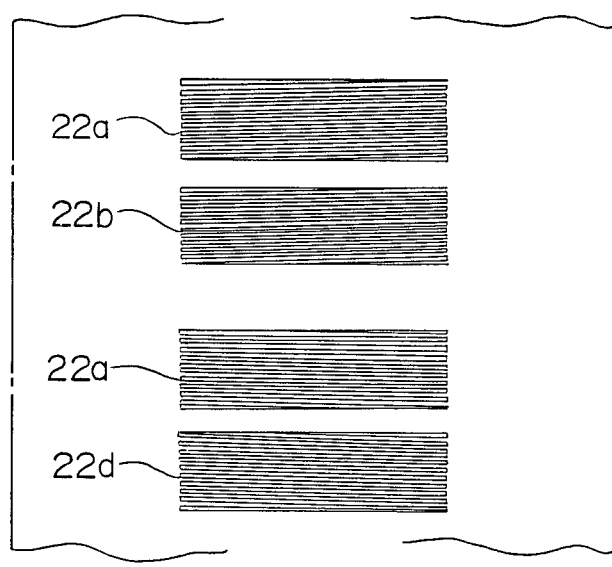
FIG. 8 is an enlarged partial front view of the mask.

The mask 4, to which a Fraunhofer diffraction image of the incilned slit groups 12a and 12b is projected in the form of clearly distinguishable bright and dark stripes, is provided with inclined slit groups 22a and 22b corresponding to the inclined slit group 12a and inclined slit groups 22c and 22d corresponding to the inclined slit group 12b, as shown in FIG. 8 in detail. The slits in the inclined slit groups 22a and 22b and the slits in the inclined slit groups 22c and 22d are inclined symmetrically and at the angle $\theta$ with respect to the direction of movement of the code plate 3 in the same way as the slits in the inclined slit group 12a and the slits in the inclined slit group 12b. The slit arrangement pitch and the slit interval of the inclined slit groups 22a - 22d in the mask 4 are selected to be slightly smaller than those of the inclined slit groups 12a and 12b in the code plate 3 so that a Moire pattern is generated by the inclined slit groups 12a and 12b and the inclined slit groups 22a 22d with a period equal to a position detection range of the inclined slit groups 12a, 12b and 22a -22d in the direction of movement of the code plate 3 and with a period equal to a detection range of the light detector 5 in the direction crossing the movement direction of the code plate 3. The slits in the inclined slit group 22a and the slits in the inclined slit group 22b are formed to have a phase shift from each other by $\pi/2$. Similarly, the slits in the inclined slit group 22c and the slits in the inclined slit group 22d are formed to have a phase shift from each other by $\pi/2$.

Figure 9:
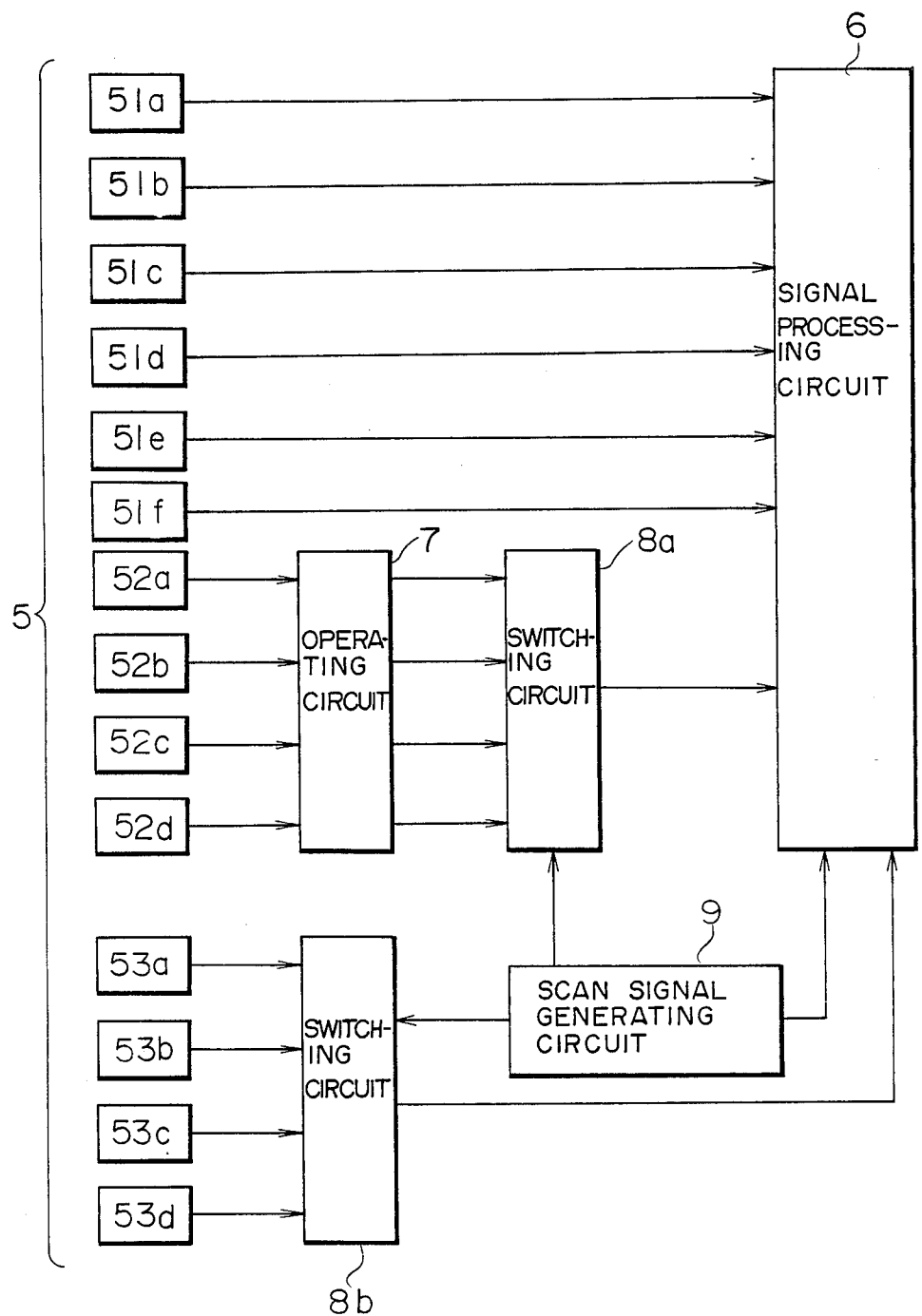
FIG. 9 is a block diagram showing a detection signal processing section.

The remaining track of the code plate 3 has a larger width and is provided with a slit group 13 including a multiplicity of slits which are formed to have a slit interval twice as large as a minimum position detection width detectable by the inclined slit groups 12a and 12b of the code plate 3 and the inclined slit groups 22a–22d of the mask 4 and to cross the direction of movement of the code plate 3 at an angle of 90°. Assuming that the position detection by the inclined slit groups 12a and 12b has a resolution of dividing the detection range of 3.2768 mm by 256, the slit interval of the slit group 13 is selected to be 0.0256 mm which is twice as large as the minimum position detection width (3.2768 mm/256=0.0128 mm) of the inclined slit groups 12a and 12b. A Fraunhofer diffraction image produced by the slit group 13 is also projected on the mask 4. The mask 4 has a slit group 23 corresponding to the slit group 13 in order to detect bright and dark stripes in the projected Fraunhofer image. The slits of the slit group 23 are inclined so as to be displaced at both end portions of a detection region of the light detector 5 by one slit interval pitch of the slit group 13 so that a Moire pattern is produced by the slit group 13 and the slit group 23. The slit group 23 is divided into four slit groups 23a–23d arranged in parallel with each other in the longitudinal direction of the slits. The light detector 5 has fourteen light detector elements which include six light detector elements 51a–51f corresponding to the slits 21a–21f of the mask 4, four light detector elements 52a–52d corresponding to the inclined slit groups 22a22d, and four light detector elements 53a–53d corresponding to the slit groups 23a –23d. As is shown in FIG. 9, the output signals of the light detector elements 51a–51f are supplied to a signal processing circuit 6, the output signals of the light detector elements 2a–52d are supplied to the signal processing circuit 6 through an operating circuit 7 and a switching circuit 8a, and the output signals of the light detector elements 53a–53d are supplied to the signal processing circuit 6 through a switching circuit 8b. Signals from a scan signal generating circuit 9 are applied to the switching circuits 8a and 8b and the signal processing circuit 6. In the signal processing circuit 6, detection data of a first order by the binary code patterns 11a–11f, detection data of a second order by the inclined slit groups 12a and 12b, and detection data of a third order by the slit group 13 are respectively converted to binary detection data, and correct position data are produced by processing the detection data on the basis of the coincidence or difference between respective overlapping digits of detection data obtained by the upper-digit (i.e. lower-order) detection part and detection data obtained by the next lower-digit (i.e. higher-order) detection part which overlapping digits are caused by the fact that the detection range of the lower-digit (higher-order) position detection part is made twice as large as the minimum position detection width of the next upper-digit (lower-order) position detection part, as will be described later in more detail.

An operation of the movable object position detecting apparatus having the above-mentioned construction will be explained hereunder.

Firstly, light emitted from a light emitting surface of the laser diode 1 is collimated by the collimator lens 2. The code plate 3 is irradiated by the collimated coherent light beams. The irradiating light beams are transmitted through the binary code patterns 11a–11f formed of Fresnel zone plates, the slits of the inclined slit groups 12a and 12b, and the slits of the slit group 13 provided in the code plate 3, while the other portions of the code plate 3 intercept the irradiating light beams. The transmitted light beams impinge upon the mask 4.

When a projection image of the binary code patterns 11a–11f coincides with the slits 21a–21f formed in the mask 4, depending on a position of the code plate 3, the corresponding light detector elements 51a–51f of the light detector 5 supply output signals to the signal processing circuit 6, thereby obtaining binary detection data which correspond to an absolute position of the code plate 3. In the present embodiment, the detection range of the binary code patterns 11a–11f is divided into 64 segments by virtue of the use of six tracks, and hence the minimum position detection width detectable by the binary code patterns 11a–11f is 1.6384 mm for the detection range of about 100 mm.

The light beams transmitted through the slits of the inclined slit groups 12a and 12b and irradiating the mask 4 are transmitted through the slits of the inclined slit groups 22a-22d of the mask 4, while the other portions of the mask 4 intercept the irradiating light beams. The light beams transmitted through the slits of the inclined slit groups 22a-22d are detected by the corresponding light detector elements 52a-52d of the light detector 5.

Since the slits of the inclined slit groups 12a, 22a and 22b and the slits of the inclined slit groups 12b, 22c and 22d are formed symmetrically with respect to a line along the direction of movement of the code plate 3, the amounts of light beams produced by the combination of the inclined slit groups 12a and 22a, 22b and the combination of the inclined slit groups 12b and 22c, 22d and irradiating the light detector 5 change as the code plate 3 moves, with the same phase when the code plate 3 moves in the above-mentioned movement direction and with the reverse phase when the code plate 3 moves in the direction crossing the above-mentioned movement direction. Accordingly, an influence on an output signal by the movement of the code plate 3 in the direction crossing the above-mentioned movement direction, that is, by fluctuations of the code plate 3 occurring during its movement can be eliminated by calculating in the operating circuit 7 a difference between output signals from the light detector elements 52a and 52d and a difference between output signals from the light detector elements 52b and 52c corresponding to the above-mentioned two combinations of inclined slit groups.

Further, since the pitch of the slits in the inclined slit groups 22a 22d of the mask 4 is made smaller than that of the slits in the inclined slit groups 12a and 12b of the code plate 3, a Moire pattern is produced in a vernier mode between the inclined slit groups 12a, 12b and the inclined slit groups 22a-22d. Further, since a phase shift of $\pi/2$ is provided between the slits of the inclined slit group 22a and the slits of the inclined slit group 22b and between the slits of the group 22c and the slits of the group 22d of the mask 4, respectively, a Moire pattern having a phase shift of $\pi/2$ is projected on the light detector elements 52a-52d of the light detector 5. The difference signals produced by the operating circuit 7 on the basis of the outputs of the light detector elements 52a-52d are sequentially selected by switches in the switching circuit 8a on the basis of a signal supplied from the scan signal generating circuit 9 and are inputted to the signal processing circuit 6 together with the scan signal. In the signal processing circuit 6, the inputted signals are inverted to produce signals having phases of $\pi$ and $3\pi/2$, and thereafter fundamental components are extracted. Thus, the signals inputted to the signal processing circuit 6 are phase-modulated in accordance with the position of the code plate 3, as the Moire pattern shifts in response to the movement of the code plate 3, and, by measuring phases of the modulated signals with respect to a reference signal based on the scan signal, a position of the code plate 3 is detected within the detection range corresponding to the arrangement pitch of the inclined slit groups 12a and 12b, which detected position data provide binary detection data. The minimum position detection width of the inclined slit groups 12a and 12b proves to be 0.0128 mm by virtue of the fact that the position detection range of 3.2768 mm twice as large as the minimum position detection width of 1.6384 mm of the binary code patterns is detected by being divided by 256 by using the slits having a slit interval of 0.0256 mm.

Next, the light beams transmitted through the slits of the slit group 13 of the code plate 3 and irradiating the mask 4 is transmitted through the slits of the slit group 23 (or slit groups 23a-23d) of the mask 4, while the other portions of the mask 4 intercept the irradiating light beams. The light beams transmitted through the slits of the slit groups 23a 23d irradiate the corresponding light detector elements 53a-53d of the light detector 5.

At this time, a Moire pattern is produced by the bright and dark stripes of a Fraunhofer diffraction image produced by the slit group 13 of the code plate 3 and by the slit groups 23a-23d of the mask 4, and it is projected on the corresponding four light detector elements 53a-53d of the light detector 5. Accordingly, photo-electric conversion signals from the light detector elements 53a-53d become periodic signals the phases of which are different from each other by $\pi/2$. The output signals of these light detector elements 53a-53d are sequentially selected by switches in the switching circuit 8b on tne basis of a signal from the scan signal generating circuit 9, and the output signals are inputted to the signal processing circuit 6 together with the scan signal. In the signal processing circuit 6, fundamental components are extracted from the inputted signals through a filter. Thus, the input signals are phase-modulated in response to a position of the code plate 3 as the Moire pattern shifts with the movement of the code plate 3. Then, by measuring phases of the modulated signals with respect to a reference signal based on the scan signal, a position of the code plate 3 is detected, and thus the detected position data provide binary detection data. Further, by dividing by 128 the position detection range of 0.0256 mm twice as large as the minimum detection width of 0.0128 mm of the inclined slit groups 12a-12d and 22a-22d by the use of the slit groups 13 and 23 thereby to perform the position detection, an absolute position of the code plate 3 can be detected with a minimum position detection width of 0.2 $\mu$m. As a result, an absolute position within a position detection range of about 100 mm can be detected with the precision of 0.2 $\mu$m.

As mentioned above, the first-order detection data corresponding to the binary code patterns 11a-11f, the second-order detection data corresponding to the inclined slit groups 12a and 12b, and the thirdorder detection data corresponding to the slit group 13 are obtained as binary data, respectively, and the detection range of a lower-digit (or higher-order) position detection part is rendered twice as large as the minimum detection width of a next upper-digit (or lower-order) position detection part. Therefore, overlapping digits appear between the upper-digit (lower-order) detection data and the lower-digit (higher-order) detection data. For example, as seen from FIG. 1 showing upper-digit detection data of $A_0$ to $E_0'$, intermediate-digit detection data of $E_0$ to $L_0'$ and lower-digit detection data of $L_0$, $M_0$, ---- , there appear overlapping digits of $E_0$ and $E_0'$ and overlapping digits of $L_0$ and $L_0'$.

TABLE 1

| Detection Data | | | | | Output Data | | | |
|---|---|---|---|---|---|---|---|---|
| 0 | 0 | 0 | 0 | 0 | 0 | 0 | 0 | 0 |
| 0 | 0 | 0 | 0 | 1 | 0 | 0 | 0 | 1 |
| 0 | 0 | 1 | 1 | 0 | 0 | 0 | 1 | 0 |
| 0 | 0 | 1 | 1 | 1 | 0 | 0 | 1 | 1 |
| 0 | 1 | 0 | 0 | 0 | 0 | 1 | 0 | 0 |
| 0 | 1 | 0 | 0 | 1 | 0 | 1 | 0 | 1 |
| 0 | 1 | 1 | 1 | 0 | 0 | 1 | 1 | 0 |

TABLE 1-continued

| Detection Data | | | | | Output Data | | | |
|---|---|---|---|---|---|---|---|---|
| 0 | 1 | 1 | 1 | 1 | 0 | 1 | 1 | 1 |
| 1 | 0 | 0 | 0 | 0 | 1 | 0 | 0 | 0 |
| 1 | 0 | 0 | 0 | 1 | 1 | 0 | 0 | 1 |
| 1 | 0 | 1 | 1 | 0 | 1 | 0 | 1 | 0 |
| 1 | 0 | 1 | 1 | 1 | 1 | 0 | 1 | 1 |
| 1 | 1 | 0 | 0 | 0 | 1 | 1 | 0 | 0 |
| 1 | 1 | 0 | 0 | 1 | 1 | 1 | 0 | 1 |
| 1 | 1 | 1 | 1 | 0 | 1 | 1 | 1 | 0 |
| 1 | 1 | 1 | 1 | 1 | 1 | 1 | 1 | 1 |
| $J_0$ | $K_0$ | $L'_0$ | $L_0$ | $M_0$ | $J_1$ | $K_1$ | $L_1$ | $M_1$ |

TABLE 2

| Detection Data | | | | | Output Data | | | |
|---|---|---|---|---|---|---|---|---|
| 0 | 0 | 0 | 0 | 0 | 0 | 0 | 0 | 0 |
| 0 | 0 | 1 | 0 | 1 | 0 | 0 | 0 | 1 |
| 0 | 0 | 1 | 1 | 0 | 0 | 0 | 1 | 0 |
| 0 | ① | 0 | 1 | 1 | 0 | ⓪ | 1 | 1 |
| 0 | 1 | 0 | 0 | 0 | 0 | 1 | 0 | 0 |
| 0 | 1 | 1 | 0 | 1 | 0 | 1 | 0 | 1 |
| 0 | 1 | 1 | 1 | 0 | 0 | 1 | 1 | 0 |
| ① | ⓪ | 0 | 1 | 1 | 0 | ① | ① | 1 |
| 1 | 0 | 0 | 0 | 0 | 1 | 0 | 0 | 0 |
| 1 | 0 | 1 | 0 | 1 | 1 | 0 | 0 | 1 |
| 1 | 0 | 1 | 1 | 0 | 1 | 0 | 1 | 0 |
| 1 | ① | 0 | 1 | 1 | 1 | ⓪ | 1 | 1 |
| 1 | 1 | 0 | 0 | 0 | 1 | 1 | 0 | 0 |
| 1 | 1 | 1 | 0 | 1 | 1 | 1 | 0 | 1 |
| 1 | 1 | 1 | 1 | 0 | 1 | 1 | 1 | 0 |
| ⓪ | ⓪ | 0 | 1 | 1 | ① | ① | 1 | 1 |
| $J_0$ | $K_0$ | $L'_0$ | $L_0$ | $M_0$ | $J_1$ | $K_1$ | $L_1$ | $M_1$ |

TABLE 3

| Detection Data | | | | | Output Data | | | |
|---|---|---|---|---|---|---|---|---|
| ① | ① | 1 | 0 | 0 | ⓪ | ⓪ | 0 | 0 |
| 0 | 0 | 0 | 0 | 1 | 0 | 0 | 0 | 1 |
| 0 | 0 | 0 | 1 | 0 | 0 | 0 | 1 | 0 |
| 0 | 0 | 1 | 1 | 1 | 0 | 0 | 1 | 1 |
| 0 | ⓪ | 1 | 0 | 0 | 0 | ① | 0 | 0 |
| 0 | 1 | 0 | 0 | 1 | 0 | 1 | 0 | 1 |
| 0 | 1 | 0 | 1 | 0 | 0 | 1 | 1 | 0 |
| 0 | 1 | 1 | 1 | 1 | 0 | 1 | 1 | 1 |
| ⓪ | ① | 1 | 0 | 0 | ① | ⓪ | 0 | 0 |
| 1 | 0 | 0 | 0 | 1 | 1 | 0 | 0 | 1 |
| 1 | 0 | 0 | 1 | 0 | 1 | 0 | 1 | 0 |
| 1 | 0 | 1 | 1 | 1 | 1 | 0 | 1 | 1 |
| 1 | ⓪ | 1 | 0 | 0 | 1 | ① | 0 | 0 |
| 1 | 1 | 0 | 0 | 1 | 1 | 1 | 0 | 1 |
| 1 | 1 | 0 | 1 | 0 | 1 | 1 | 1 | 0 |
| 1 | 1 | 1 | 1 | 1 | 1 | 1 | 1 | 1 |
| $J_0$ | $K_0$ | $L'_0$ | $L_0$ | $M_0$ | $J_1$ | $K_1$ | $L_1$ | $M_1$ |

Paying attention to $J_0$, $K_0$ and $L'_0$ in the intermediate-digit detection data and $L_0$ and $M_0$ in the lower-digit detection data, when the respective boundary portions of the intermediate-digit position detection part and the lower-digit position detection part coincide with each other with higher precision as compared with the position detection precision, $L'_0$ and $L_0$ coincide with each other as shown in Table 1. Then, ignoring $L'_0$ in the higher-digit data, $L_0$ in the lower-digit data may be adopted as correct position data $L_1$. When the intermediate-digit detection part is in advance of the lower-digit detection part, correct position data may be obtained by inverting the digit(s) enclosed by a circle in the intermediatedigit detection data and then by ignoring $L'_0$ thereby to form output data, as shown in Table 2. On the other hand, when the intermediate-detection part is lagging behind the lower-digit detection part, it is necessary to invert the digit(s) enclosed by a circle in the intermediate-digit detection data, as shown in Table 3.

The logic of the above-mentioned inversion of detection data is illustrated in FIG. 1. When $L_0$ and $L'_0$ of the overlapping digits are not equal to each other and $L'$ is not equal to a digit $M_0$ lower than $L_0$ by one digt, a digit $K_0$ upper than $L'_0$ by one digit is inverted. Further, when the inversion of $K_0$ gives an influence on a further upper digit, that is, when the digit of the inverted $K_0$ does not coincide with the digit of $L'_0$, the upper digit of $J_0$ is also inverted. This rule is applied successively to further upper digits. In this manner, temporary data $E_1$ to $M_1$ are obtained which include the intermediate-digit position data and the lower-digit position data after the correction and the upper-digit detection data $A_0$ to $E'_0$. Next, a similar inversion processing is effected between the temporary data and the upper-digit detection data. Explanation of a further inversion processing will be omitted since the above-mentioned inversion logic is similarly applicable to the upper-digit detection data $A_0$ to $E'_0$ and the temporary data $E_1$, $F_1$, ----, $M_1$. As a result, binary position data of $A_1$ to $M_1$ are obtained. Thereafter, the binary position data thus obtained are converted to usual decimal data to be displayed as position data.

Figure 2:
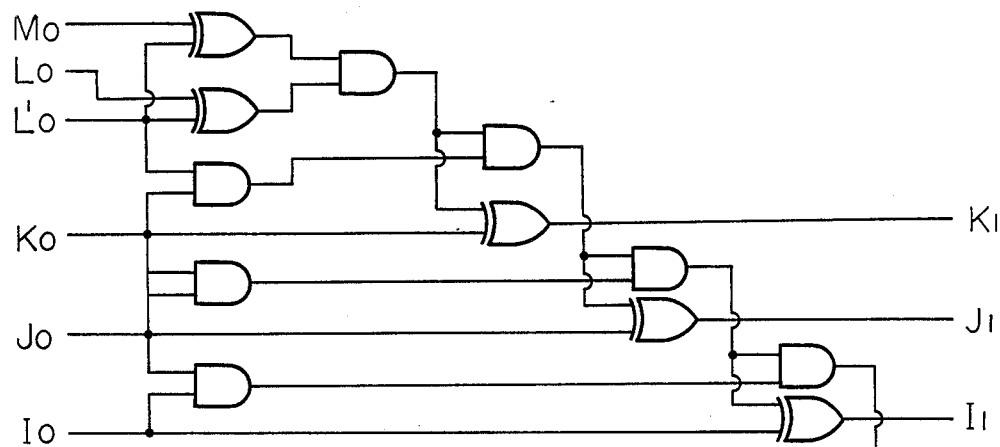
FIG. 2 is a circuit diagram showing a data processing circuit for performing the data processing shown in FIG. 1.

The above-described conversion of detection data to position data on the basis of the coincidence or difference between respective overlapping digits can be executed by means of hardware and at real time by using a data processing circuit such as shown in FIG. 2.

Figure 3:
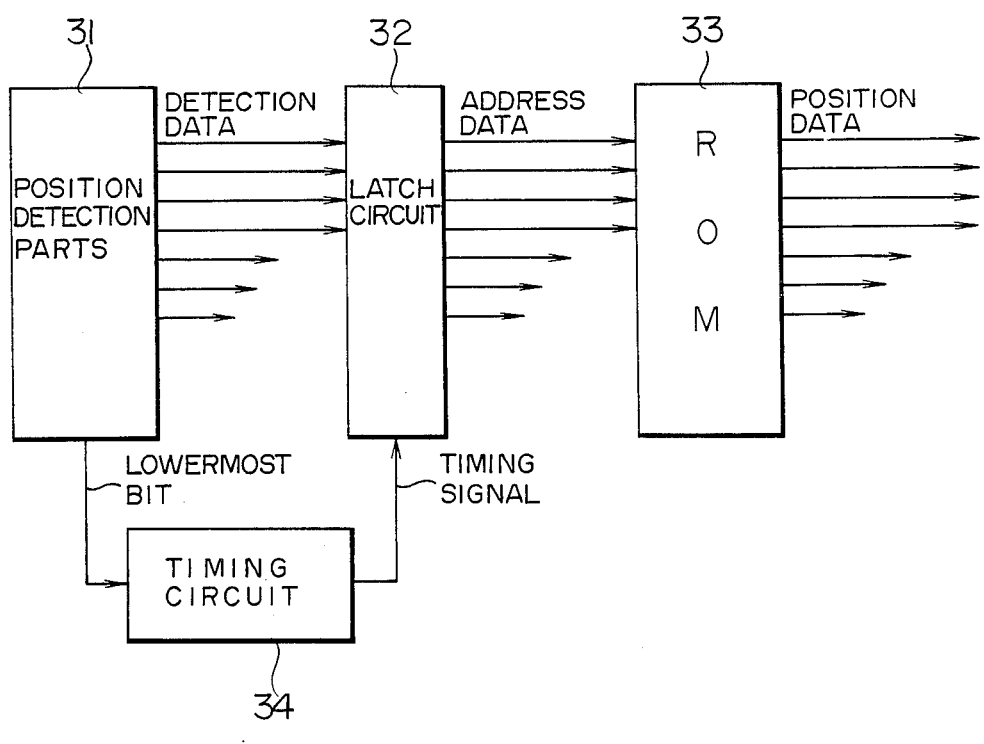
FIG. 3 is a block diagram showing another data processing arrangement.

A circuit arrangement such as shown in FIG. 3 may be used in place of the data processing circuit in FIG. 2. In the circuit arrangement shown in FIG. 3, detection data of the upper-digit, intermediate-digit and lower-digit position detection parts 31 are treated as a series of address data as they are, and position data corresponding to every possible address data are stored in a ROM 33. When the lowermost bit of the position detection parts 31 changes, a timing cicuit 34 generates a timing signal and applies it to a latch circuit 32 to cause the latch circuit 32 to latch the detection data, and then the detection data are applied as address data to the ROM 33 so that position data corresponding to the inputted address data are outputted from the ROM 33.

Further, in place of performing the inversion processing by means of hardware by using the data processing circuit shown in FIG. 2, it is possible to convert the detection data to the position data by means of software, in which, when the above-mentioned inversion condition is satisfied, the upper-digit detection data or the intermediate-digit detection data excepting respective overlapping digits are treated as a numeral train, and "1" is added to or subtracted from the numeral train. That is, when the upper-digit or intermediate-digit position detection part is in advance of the intermediate-digit or lower-digit position detection part, respectively, "1" is subtracted from the numeral train. On the other hand, when the upper-digit or intermediate-digit position detection part is lagging behind the intermediate-digit or lower-digit position detection part, respectively, "1" is added to the numeral train. The decision on whether the upper-digit or intermediate-digit position detection part is in advance of or lagging behind the intermediate-digit or lower-digit position detection part, respectively, can be made by comparing the overlapping digit $L'_0$ or $E'_0$ in the upper-digit or intermediate-digit detection data, respectively, with a digit $M_0$ or $F_0$ in the intermediate-digit or lower-digit detection data which is lower than the overlapping digit by one digit and by deciding to be advancing if $L'_0 < M_0$ or $E'_0 < F_0$ and to be lagging if $L'_0 > M_0$ or $E'_0 > F_0$.

In the foregoing embodiment, the binary code patterns have been used in the first-order position detection part. Alternatively, the first-order position detection part may be constructed in the same way as the second-order position detection part including the combination of the inclined slit groups 12a and 12b in the code plate 3 and the inclined slit groups 22a-22d in the mask 4, only, by using inclined slit groups having a further smaller inclination angle. Further, if the position detection range is narrow, the first-order position detection part in the abovedescribed embodiment can be omitted.

According to the above-mentioned movable object position detecting method of the present invention, an absolute position of the code plate can be detected with high precision, at low cost by using a smaller number of light detector elements, and with good response, by using a first-order position detection part and a second and higher order position detection parts. Further, since detection data are processed as binary data and a detection range of a lower-digit position detection part is rendered twice as large as the minimum position detection width of a next upper-digit position detection part so that position detection at the boundary portions of an upper- and a lower-digit position detection parts is performed on the basis of the coincidence or difference between respective over-lapping digits in the detection data of the upper-digit position detection part and in the detection data of the lower-digit position detection part, a detection error can be completely eliminated if a boundary position between the upper-digit and lower-digit position detection parts is determined, with both parts being associated with each other, with precision which is one half the position precision for the over-lapping digits.

Further, according to the movable object position detecting apparatus of the present invention using the data processing circuit, the data processing circuit can output correct position data by correcting the detection data by means of hardware and at real time, and thus with high response. According to the movable object position detecting apparatus of the present invention using the memory, position data are outputted from the memory in accordance with addresses corresponding to detection data, thereby making it possible to provide satisfactory response and to correct a detection error resulting from the discontinuity between the boundary portions of the position detection parts. According to the movable object position detecting apparatus of the present invention using the operational processing section, position data are obtained by means of software by the use of the operational processing section, thereby providing great advantages of simplification of the hardware structure, etc.

I claim:

1. A movable object position detecting method comprising the steps of:
   detecting an absolute position of a code plate attached to the movable object by a first-order position detection part provided with patterns regularly arranged in the code plate, thereby providing binary detection data;
   detecting a position of the code plate within a predetermined detection range by respective second and higher order position detection parts, each of said second and higher order position detection parts providing respective binary detection data, the predetermined detection range of each of said second and higher order detection parts being twice as large as a minimum detection width of a next lower order position detection part; and
   performing position detection at a boundary portion between a lower-order position detection part and a next higher-order position detection part on the basis of the coincidence or difference between respective overlapping digits of detecting data obtained by the lower-order position detection part and detection data obtained by the next higher-order position detection part.

2. A movable object position detecting apparatus comprising:
   a first-order positin detection part for detecting an absolute position of a code plate attached to the movable object by means of patterns regularly arranged in the code plate, thereby providing binary detection data;
   respective second and higher order position detection parts for detecting a position of the code plate within respective detection ranges, each of said second and higher order position detecting parts providing respective binary data, the predetermined detection range of each of said second and higher order detection parts being twice as large as a minimum detection width of a next lower order position detection part; and
   a data processing circuit for producing correct position data by performing a logical operation on the basis of the coincidence or difference between respective overlapping digits of detection data obtained by a lower-order position detection part and detecting data obtained by a next higher-order position detection part.

3. A movable object position detecting apparatus comprising:
   a first-order position detection part for detecting an absolute position of a code plate attached to the movable object by means of patterns regularly arranged in the code plate, thereby providing binary detection data;
   respective second and higher order position detection parts by detecting a position of the code plate within respective detection ranges, each of said second and higher order position detecting parts providing respective binary data, the predetermined detection range of each of said second and higher order detection parts being twice as large as a minimum detection width of a next lower order position detection part; and
   memory means into which detection data obtained by a lower-order position detection part and detection data obtained by a next higher order position detection part are entered as a series of address data, both of the detection data including respective digits which overlap each other, said memory means storing position data corresponding to respective addresses.

4. A movable object position detecting apparatus comprising:
   a first-order position detection part for detecting an absolute position of a code plate attached to the movable object by means of patterns regularly arranged in the code plate, thereby providing binary detection data;

respective second and higher order position detection parts for detecting a position of the code plate within respective detection ranges, each of said second and higher order position detecting parts providing respective binary data, the predetermined detection range of each of said second and higher order detection parts being twice as large as a minimum detection width of a next lower order position detection part; and operational processing means for producing position data by correcting detection data obtained by a lower-order position detection part on the basis of the coincidence or difference between respective overlapping digits of detection data obtained by the lower-order position detection part and detection data obtained by the next higher-order position detection part.

* * * * *